(12) United States Patent
Adaskin et al.

(10) Patent No.: US 7,875,463 B2
(45) Date of Patent: Jan. 25, 2011

(54) GENERALIZED PULSE JET EJECTION HEAD CONTROL MODEL

(75) Inventors: David R. Adaskin, San Jose, CA (US); Bill J. Peck, Mountain View, CA (US); Stanley P. Woods, Cupertino, CA (US); William G. Chesk, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1293 days.

(21) Appl. No.: 10/809,981

(22) Filed: Mar. 26, 2004

(65) Prior Publication Data

US 2005/0214775 A1 Sep. 29, 2005

(51) Int. Cl.
*B01L 3/02* (2006.01)
*G01N 1/10* (2006.01)
*G05B 15/00* (2006.01)

(52) U.S. Cl. ............................ 436/180; 436/43; 436/49; 700/17; 700/32; 700/241; 700/266; 700/283; 422/100

(58) Field of Classification Search .................. 422/100, 422/63–68.1; 436/43, 180, 49; 700/17, 32, 700/52, 57, 65, 241, 266, 283
See application file for complete search history.

(56) References Cited

U.S. PATENT DOCUMENTS

| | | | |
|---|---|---|---|
| 5,091,652 A | 2/1992 | Mathies et al. | |
| 5,260,578 A | 11/1993 | Bliton et al. | |
| 5,296,700 A | 3/1994 | Kumagai | |
| 5,324,633 A | 6/1994 | Fodor et al. | |
| 5,336,467 A * | 8/1994 | Heidt et al. | 422/64 |
| 5,389,341 A * | 2/1995 | Tuunanen et al. | 422/100 |
| 5,567,595 A * | 10/1996 | Kok | 435/7.92 |
| 5,585,639 A | 12/1996 | Dorsel et al. | |
| 5,760,951 A | 6/1998 | Dixon et al. | |
| 5,763,870 A | 6/1998 | Sadler et al. | |
| 5,907,493 A * | 5/1999 | Boyer et al. | 700/231 |
| 6,063,339 A * | 5/2000 | Tisone et al. | 422/67 |
| 6,084,991 A | 7/2000 | Sampas | |
| 6,090,348 A * | 7/2000 | Steele et al. | 422/67 |
| 6,222,664 B1 | 4/2001 | Dorsel | |
| 6,284,465 B1 | 9/2001 | Wolber | |
| 6,320,196 B1 | 11/2001 | Dorsel et al. | |
| 6,351,690 B1 * | 2/2002 | Lenz | 700/245 |
| 6,355,934 B1 | 3/2002 | Osgood et al. | |
| 6,371,370 B2 | 4/2002 | Sadler et al. | |
| 6,416,713 B1 * | 7/2002 | Ford et al. | 422/63 |
| 6,472,218 B1 * | 10/2002 | Stylli et al. | 436/48 |
| 6,589,791 B1 * | 7/2003 | LaBudde et al. | 436/55 |
| 6,638,770 B1 * | 10/2003 | Montagu | 436/174 |
| 6,878,554 B1 * | 4/2005 | Schermer et al. | 436/180 |
| 6,890,760 B1 * | 5/2005 | Webb | 436/180 |
| 6,943,036 B2 * | 9/2005 | Bass | 436/180 |

(Continued)

OTHER PUBLICATIONS

Agilent G2565AA Microarray Scanner System with SureScan Technology User Manuel, Third Edition, Sep. 2002.

*Primary Examiner*—Brian R Gordon

(57) ABSTRACT

A generalized printhead control model is provided herein as a basis for configuring printhead control software that will operate any selected printhead or group of printheads. The subject model covers a hierarchy of classes for the attributes of software that controls the printheads in a system, such as for producing a biopolymer array.

22 Claims, 4 Drawing Sheets

U.S. PATENT DOCUMENTS

| | | | | |
|---|---|---|---|---|
| 6,979,425 B1 * | 12/2005 | Ganz et al. | | 422/100 |
| 6,986,993 B1 * | 1/2006 | Ghosh et al. | | 435/7.1 |
| 6,998,230 B1 * | 2/2006 | Schantz et al. | | 435/6 |
| 7,101,508 B2 * | 9/2006 | Thompson et al. | | 422/67 |
| 7,151,982 B2 * | 12/2006 | Liff et al. | | 700/241 |
| 7,276,336 B1 * | 10/2007 | Webb et al. | | 435/6 |
| 7,335,338 B2 * | 2/2008 | Schermer et al. | | 422/100 |
| 2002/0076818 A1 * | 6/2002 | Vessey et al. | | 436/55 |
| 2002/0110494 A1 * | 8/2002 | Lemme et al. | | 422/100 |
| 2002/0159919 A1 * | 10/2002 | Churchill et al. | | 422/100 |
| 2003/0143329 A1 * | 7/2003 | Shchegrova et al. | | 427/256 |
| 2004/0151635 A1 * | 8/2004 | Leproust et al. | | 422/100 |
| 2004/0171171 A1 * | 9/2004 | Appoldt et al. | | 436/180 |
| 2004/0241667 A1 * | 12/2004 | Chesk et al. | | 435/6 |
| 2005/0271551 A1 * | 12/2005 | Shumate et al. | | 422/100 |

* cited by examiner

GENERALIZED PULSE JET EJECTION HEAD CONTROL MODEL

BACKGROUND OF THE INVENTION

Array assays between surface bound binding agents or probes and target molecules in solution may be used to detect the presence of particular biopolymeric analytes in the solution. The surface-bound probes may be oligonucleotides, peptides, polypeptides, proteins, antibodies or other molecules capable of binding with target biomolecules in the solution. Such binding interactions are the basis for many of the methods and devices used in a variety of different fields, e.g., genomics (in sequencing by hybridization, SNP detection, differential gene expression analysis, identification of novel genes, gene mapping, finger printing, etc.) and proteomics.

One typical array assay method involves biopolymeric probes immobilized in an array on a substrate such as a glass substrate or the like. A solution containing target molecules ("targets") that bind with the attached probes is placed in contact with the bound probes under conditions sufficient to promote binding of targets in the solution to the complementary probes on the substrate to form a binding complex that is bound to the surface of the substrate. The pattern of binding by target molecules to probe features or spots on the substrate produces a pattern, i.e., a binding complex pattern, on the surface of the substrate which is detected. This detection of binding complexes provides desired information about the target biomolecules in the solution.

The binding complexes may be detected by reading or scanning the array with, for example, optical means, although other methods may also be used, as appropriate for the particular assay. For example, laser light may be used to excite fluorescent labels attached to the targets, generating a signal only in those spots on the array that have a labeled target molecule bound to a probe molecule. This pattern may then be digitally scanned for computer analysis. Such patterns can be used to generate data for biological assays such as the identification of drug targets, single-nucleotide polymorphism mapping, monitoring samples from patients to track their response to treatment, assessing the efficacy of new treatments, etc.

Biopolymer arrays can be fabricated using either deposition of the previously obtained biopolymers or in situ synthesis methods. The deposition methods basically involve depositing biopolymers at predetermined locations on a substrate which are suitably activated such that the biopolymers can link thereto. Biopolymers of different sequence may be deposited at difference regions on the substrate to yield the completed array. Typical procedures known in the art for deposition of previously obtained polynucleotides, particularly DNA, such as whole oligomers or cDNA, are to load a small volume of DNA in solution in one or more drop dispensers such as the tip of a pin or in an open capillary and, touch the pin or capillary to the surface of the substrate. Such a procedure is described in U.S. Pat. No. 5,807,522. When the fluid touches the surface, some of the fluid is transferred. The pin or capillary must be washed prior to picking up the next type of DNA for spotting onto the array. This process is repeated for many different sequences and, eventually, the desired array is formed. Alternatively, the DNA can be loaded into a drop dispenser in the form of a pulse jet head and fired onto the substrate. Such a technique has been described PCT publications WO 95/25116 and WO 98/41531, "Multiple Reservoir Ink Jet Device for the Fabrication of Biomolecular Arrays," Ser. No. 09/150,507 filed Sep. 9, 1998; U.S. Patent application publications 2003/0112295 and 2003/0113730; and patents including U.S. Pat. Nos. 6,242,266 and 6,613,893—as well as the references cited in each noted item (all, incorporated herein by reference) and others.

The in situ synthesis methods include those described in U.S. Pat. No. 5,449,754 for synthesizing peptide arrays, as well as WO 98/41531 and the references cited therein for synthesizing polynucleotides (specifically, DNA) using phosphoramidite or other chemistry. Additional patents describing in situ nucleic acid array synthesis protocols and devices include U.S. Pat. Nos. 6,451,998; 6,446,682; 6,440,669; 6,420,180; 6,372,483; and 6,323,043—the disclosures of which patents are herein incorporated by reference.

Such in situ synthesis methods can be basically regarded as iterating the sequence of depositing droplets of: (a) a protected monomer onto predetermined locations on a substrate to link with either a suitably activated substrate surface (or with previously deposited deprotected monomer); (b) deprotecting the deposited monomer so that it can react with a subsequently deposited protected monomer; and (c) depositing another protected monomer for linking. Different monomers may be deposited at different regions on the substrate during any one cycle so that the different regions of the completed array will carry the different biopolymer sequences as desired in the completed array. One or more intermediate further steps may be required in each iteration, such as oxidation and washing steps.

Known in-situ DNA or other bioploymer microarray writers built in the past have used one type of printhead from one vendor. Writer software to control the printhead(s) was produced on an altogether custom basis in view of the printhead chosen and overall system design. Yet, for various reasons one might want to explore the possibilities of using different types of printheads, potentially from different vendors. Such an approach may offer a choice between printhead vendors at any point in the design process of a printer system or during a printer systems lifecycle. It may facilitate substantial system upgrades or provide adaptability in the event of the loss of a supplier. Still further, it would be desirable to produce a more transparent or less specialized system of control than presently available. In which case, lesser reliance may be placed on any particular individual if the system can be easily understood by those other than the original implementer. Such flexibility, again, moderates risk. In addition, it may offer freedom from using certain (possibly protected) firmware provided by the printhead vendor. Also, a specific printhead may not allow printing in a given desired pattern, upon a given desired media, temperature ranges, firing speeds, nozzle spacing, drop size, chemistrie(s). Furthermore, know systems do not allow for mixing different models of printhead assemblies form a single or multiple vendor.

Current printhead models differ from each other in many ways. Among these ways are: the number of different fluids that can be fired, the spacing of the nozzles, the arrangement of the nozzles, etc. Accordingly, it is presently the case that to change-over printhead control accommodating one printhead to another model would require substantial changes to the basic algorithms of the software that controls the writer. As such, there exists a need for producing writer/printhead control software that is not so bound-up with the hardware design it is intended to control that its utility is unduly limited.

SUMMARY OF THE INVENTION

The present invention offers a generalized printhead control model in order to remedy the problem perceived and expressed above stemming from a lack of design flexibility concerning the use of available printheads. The inventive model provided herein describes a basis for producing software that will work with numerous printhead or group of printheads—preferably any number printhead or group of printheads. The subject generalized printhead model covers a hierarchy of classes that encapsulate the attributes and behavior of software that controls the printhead in a system that requires precise and repeatable placement of features of several different fluids on the same substrate material.

As opposed to current biopolymer array production systems that require a substantial re-write of the software for driving printhead function whenever a new piece of hardware is changed, this invention instructs the builder of a biopolymer array production system how to write configurable software once that accounts for the many possible ways that hardware, like the printhead, may change. When hardware changes are made, the builder simply changes the configuration of the software to bring the production tool into operation again.

This change may be effected in any of a number of ways. For example, memory files and programming module(s) may be provided to enable simple plug-and-play operability in reconfiguring the system for use. In which case, the printer cartridge or other associated hardware to be changed may be set into a standard socket (possibly the printhead holder) that collects the data required from electronic media associated with a printhead or a printhead assembly when plugged into the subject system. The data may alternately be introduced by way of a PCI or USB interface, a CD or DVD containing the relevant date, via Bluetooth wireless or other by reading another electronic media. Still further, relevant data or criteria may be directly entered by a user—in response to prompts from a user interface such as provided in connection with a display of a general purpose computer or a touch screen monitor, or otherwise.

In sum, the subject invention provides a basis for producing software code that will work with a given configuration of selected printhead(s). The model sets forth a hierarchy of classes that capture the necessary attributes and behavior of printing system for software to control the printhead that requires precise placement of features of several different fluids on a substrate. Accordingly, the present invention provides a computer program product. The computer program product may comprise a computer readable medium which, when loaded into a programmable computer, executes a method described herein. The present invention also includes the subject methodology, programming defining the same, including such algorithms as applied to the array fabrication, hardware configured to run according to the methodology and arrays produced utilizing the teachings herein.

BRIEF DESCRIPTION OF THE DRAWINGS

Each of the figures diagrammatically illustrates aspects of the invention. To facilitate understanding, the same reference numerals have been used (where practical) to designate similar elements that are common to the figures.

DEFINITIONS

Figure 1:
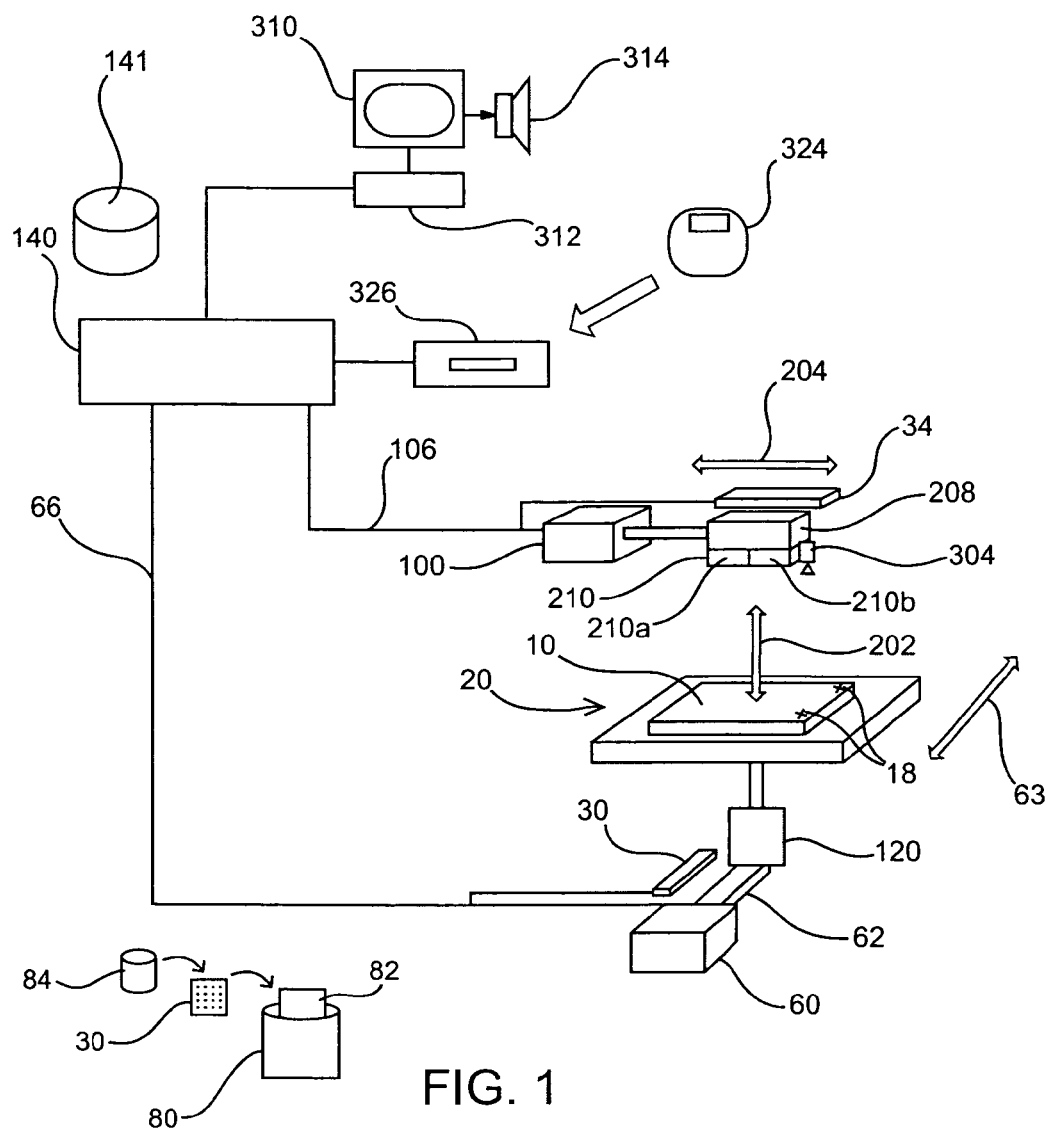
FIG. 1 shows an array fabrication system as may be used in the present invention.

Unless defined otherwise, all technical and scientific terms used herein have the same meaning as commonly understood by one of ordinary skill in the art to which this invention belongs. Still, certain elements are defined below for the sake of clarity and ease of reference.

A "biopolymer" is a polymer of one or more types of repeating units. Biopolymers are typically found in biological systems and particularly include polysaccharides (such as carbohydrates), peptides (which term is used to include polypeptides and proteins) and polynucleotides as well as their analogs such as those compounds composed of or containing amino acid analogs or non-amino acid groups, or nucleotide analogs or non-nucleotide groups. Biopolymers include polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. Biopolymers include DNA (including cDNA), RNA, oligonucleotides, and PNA and other polynucleotides as described in U.S. Pat. No. 5,948,902 and references cited therein (the disclosure of which is incorporated herein by reference), regardless of the source. An "oligonucleotide" generally refers to a nucleotide multimer/polymer) of about 10 to 100 nucleotides in length, while a "polynucleotide" includes a nucleotide multimer having any number of nucleotides. A "biomonomer" references a single unit, which can be linked with the same or other biomonomers to form a biopolymer (e.g., a single amino acid or nucleotide with two linking groups one or both of which may have removable protecting groups).

An "array," includes any one dimensional, two-dimensional or substantially two-dimensional (as well as a three-dimensional) arrangement of addressable regions bearing a particular chemical moiety or moieties (e.g., biopolymers such as polynucleotide sequences (nucleic acids), polypeptides (e.g., proteins), etc.) associated with that region. In the broadest sense, the preferred arrays are arrays of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

The term "substrate" as used herein refers to a surface upon which marker molecules or probes, e.g., an array, may be adhered. Glass slides are the most common substrate for biochips, although fused silica, silicon, plastic and other materials are also suitable. The term "flexible" is used herein to refer to a structure, e.g., a bottom surface or a cover, that is capable of being bent, folded or similarly manipulated without breakage. For example, a cover is flexible if it is capable of being peeled away from the bottom surface without breakage. "Flexible" with reference to a substrate or substrate web, references that the substrate can be bent 180 degrees around a roller of less than 1.25 cm in radius. The substrate can be so bent and straightened repeatedly in either direction at least 100 times without failure (for example, cracking) or plastic deformation. This bending must be within the elastic limits of the material. The foregoing test for flexibility is performed at a temperature of 20° C. A "web" references a long continuous piece of substrate material having a length greater than a width. For example, the web length to width ratio may be at least 5/1, 10/1, 50/1, 100/1, 200/1, or 500/1, or even at least 1000/1. The substrate may be flexible (such as a flexible web). When the substrate is flexible, it may be of various lengths including at least 1 m, at least 2 m, or at least 5 m (or even at least 10 m). The term "rigid" is used herein to refer to a structure e.g., a bottom surface or a cover that does not readily bend without breakage, i.e., the structure is not flexible.

Any given substrate may carry one, two, four or more arrays disposed on a front surface of the substrate. Depending upon the use, any or all of the arrays may be the same or different from one another and each may contain multiple spots or features. A typical array may contain more than ten, more than one hundred, more than one thousand, more ten thousand features, or even more than one to five hundred thousand features, in an area of less than 20 cm$^2$ or even less than 10 cm$^2$. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents. It will be appreciated though, that the interfeature areas, when present, could be of various sizes and configurations.

Each array may cover an area of less than 100 cm$^2$, or even less than 50 cm$^2$, 10 cm$^2$ or 1 cm$^2$. In many embodiments, the substrate carrying the one or more arrays will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, substrate 10 may transmit at least 20%, or 50% (or even at least 70%, 90%, or 95%), of the illuminating light incident on the front as may be measured across the entire integrated spectrum of such illuminating light or alternatively at 532 nm or 633 nm.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one which is to be evaluated by the other (thus, either one could be an unknown mixture of polynucleotides to be evaluated by binding with the other).

A "pulse jet" is a device that can dispense drops/droplets in the formation/fabrication of an array. Pulse jets operate by delivering a pulse of pressure (such as by a piezoelectric or thermoelectric element) to liquid adjacent an outlet or orifice such that a drop will be dispensed therefrom. When the arrangement, selection, and movement of "dispensers" is referenced herein, it will be understood that this refers to the point from which drops are dispensed from the dispensers (such as the outlet orifices or nozzles of pulse jets).

A "drop" in reference to the dispensed liquid does not imply any particular shape, for example a "drop" dispensed by a pulse jet only refers to the volume dispensed on a single activation. A drop that has contacted a substrate is often referred to as a "deposited drop" or "sessile drop" or the like, although sometimes it will be simply referenced as a drop when it is understood that it was previously deposited. The terms "fluid" and "liquid" are used synonymously herein in reference to a solution or other flowable and/or printable medium. Detecting a drop "at" a location, includes the drop being detected while it is traveling between a dispenser and that location, or after it has contacted that location (and hence may no longer retain its original shape).

An "array layout" refers to one or more characteristics of the features, such as feature positioning on the substrate, one or more feature dimensions, and an indication of a moiety at a given location. "Hybridizing" and "binding", with respect to polynucleotides, are used interchangeably.

A "scan region" refers to a contiguous (e.g., rectangular) area in which the array spots or features of interest, as defined above, are found. The scan region is that portion of the total area illuminated from which the resulting fluorescence, chemiluminescence, or other optical detection techniques is detected and recorded. For the purposes of this invention, the scan region includes the entire area of the slide scanned in each pass of the lens, between the first feature of interest, and the last feature of interest, even if there exist intervening areas that lack features of interest. The scan region does not, however, include "border regions" or "borders" of the array substrate/slide adjacent slide edges and adjacent to but not including or covered by array features. Generally, any borders around the scan region are less than about 5-15 mm and can be as little as 1 mm, or even smaller, if the mechanical design of the slide holder permits it. It is often desirable to lay down features as close to the edge of the substrate as possible so as to maximize the number of different probes that may be displayed on a given surface area. As such, in many array configurations, the width of a border, if present, between the scanned arrays and the slide edge does not exceed about 20 mm, usually does not exceed about 10 mm and more usually does not exceed about 5 mm. "Lens position" refers to the relative distance between the lens or optical objective(s) of a scanner and a caddy carrying a slide and/or the slide or array itself.

By "remote location," it is meant a location other than the location at which the array is present and hybridization occurs. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. An array "package" may be the array plus only a substrate on which the array is deposited, although the package may include other features (such as a housing with a chamber). A "chamber" references an enclosed volume (although a chamber may be accessible through one or more ports). It will also be appreciated that throughout the present application, that words such as "top," "upper," and "lower" are used in a relative sense only.

A "computer-based system" refers to the hardware means, software means, and data storage means used to analyze the information of the present invention. The minimum hardware of the computer-based systems of the present invention comprises a central processing unit (CPU), input means, output means, and data storage means. A skilled artisan can readily appreciate that any one of the currently available computer-based system are suitable for use in the present invention. The data storage means may comprise any manufacture comprising a recording of the present information as described above, or a memory access means that can access such a manufacture.

To "record" data, programming or other information on a computer readable medium refers to a process for storing information, using any such methods as known in the art. Any convenient data storage structure may be chosen, based on the means used to access the stored information. A variety of data processor programs and formats can be used for storage, e.g. word processing text file, database format, etc.

A "processor" references any hardware and/or software combination which will perform the functions required of it. For example, any processor herein may be a programmable digital microprocessor such as available in the form of an electronic controller, mainframe, server or personal computer (desktop or portable). Where the processor is programmable, suitable programming can be communicated from a remote location to the processor, or previously saved in a computer program product (such as a portable or fixed computer readable storage medium, whether magnetic, optical or solid state device based). For example, a magnetic medium or optical disk may carry the programming, and can be read by a suitable reader communicating with each processor at its corresponding station.

Furthermore, the words such as "top", "upper", and "lower" are used in a relative sense only. Also, when one thing is "moved", "moving", "re-positioned", "scanned", or the like, with respect to another, this implies relative motion only such that either thing or both might actually be moved in relation to the other. For example, when dispensers are "moved" relative to a substrate, either one of the dispensers or substrate may actually be put into motion by the transport system while the other is held still, or both may be put into motion.

DETAILED DESCRIPTION OF THE INVENTION

In describing the invention in greater detail than provided in the Summary and as informed by the Background and Definitions provided above, the subject program or process aspects of the invention are first described. Next, exemplary array fabrication hardware is described, including invention-specific hardware aspects of the same. This discussion is followed by a brief discussion of methods of using an array produced with such hardware run according to the subject methodology including which scanners may be used, and kits for use with product produced according to the invention.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element (as indicated by use of any permissive term such as the words "may," "might," "possible," etc.). Accordingly, this statement is intended to serve as antecedent basis for use of such exclusive terminology as "solely," "only" and the like in connection with the recitation of claim elements, or use of a "negative" limitation therewith.

Methodology/Programming

Application of the aforementioned generalized printhead control model optionally offers benefits in terms of efficiency by way of re-use of software for printing applications of two-dimensional arrays using a number of different fluids are created precisely and repeatably. A prime example of such activity is in biopolymer array printing. As evident from the hierarchy expressed herein, the subject generalized—printhead model may be applied across any number of applications that use different sets of printheads that vary by number of nozzles, nozzle spacing, number of wells, etc.

As for the particular use of the subject invention, control software produced according to the model described herein provides in one aspect a method for fabricating a chemical (e.g., biopolymer) array with multiple features. The method includes directing ejection of reagent drops from a pulse jet print or ejection head spaced from a substrate onto a substrate surface. Of course, the print head and the substrate will move relative to each other (i.e., one or the other or both may be moved) during this procedure in order to lay down the desired array pattern. The array may be a biopolymer array (e.g., a polynucleotide array), in which case at least some of the ejected drops comprise the biopolymers or their precursor units (e.g., monomer units of the biopolymers).

As to the hardware employed in such methodology, the apparatus will generally include a substrate station to retain a substrate thereon. An ejection head is provided facing and spaced from a retained substrate. A transport system moves one of the head and retained substrate relative to the other. A control unit controls the ejection head and transport system so as to execute a method of the present invention. For example, the control unit ejects drops from the ejection head while the head is spaced apart from a retained substrate surface and during movement relative to the substrate surface, onto the substrate surface while performing quality control.

In any case, the present invention typically involves software and hardware associated with biopolymer array production in connection with pulse-jet delivery of such material. Programming embodying the methodology may be loaded onto array production equipment, or the system may be pre-programmed to run with the same. The programming can be recorded on computer readable media, (e.g., any medium that can be read and accessed directly by a computer). Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information.

In a preferred mode, the programming is expressed in "Object-Oriented Programming." In such instances, an "Object" is a software representation of something in the real world. Objects can have attributes and behavior. Classes of Objects are provided. In Object Oriented Programming, a programmer defines the data and behavior of a class. During the execution of the program some number of objects of a set of classes are "instantiated" and interact to produce the desired result. The relationship between Objects controlling the instantiated action is provided in the form of associations. In order to express such programming in the abstract, Unified Modeling Language (UML) may be employed.

UML is a set of well-defined symbols that aid in this abstract design process by providing a clear means of expressing necessary concepts. A UML Diagram illustrates various static and dynamic aspects of a software system. On another level, a UML Class Diagram shows the classes involved in a software system and key details of their relationships. This latter sort of diagram does not show the dynamic behavior of the system.

Figure 3:
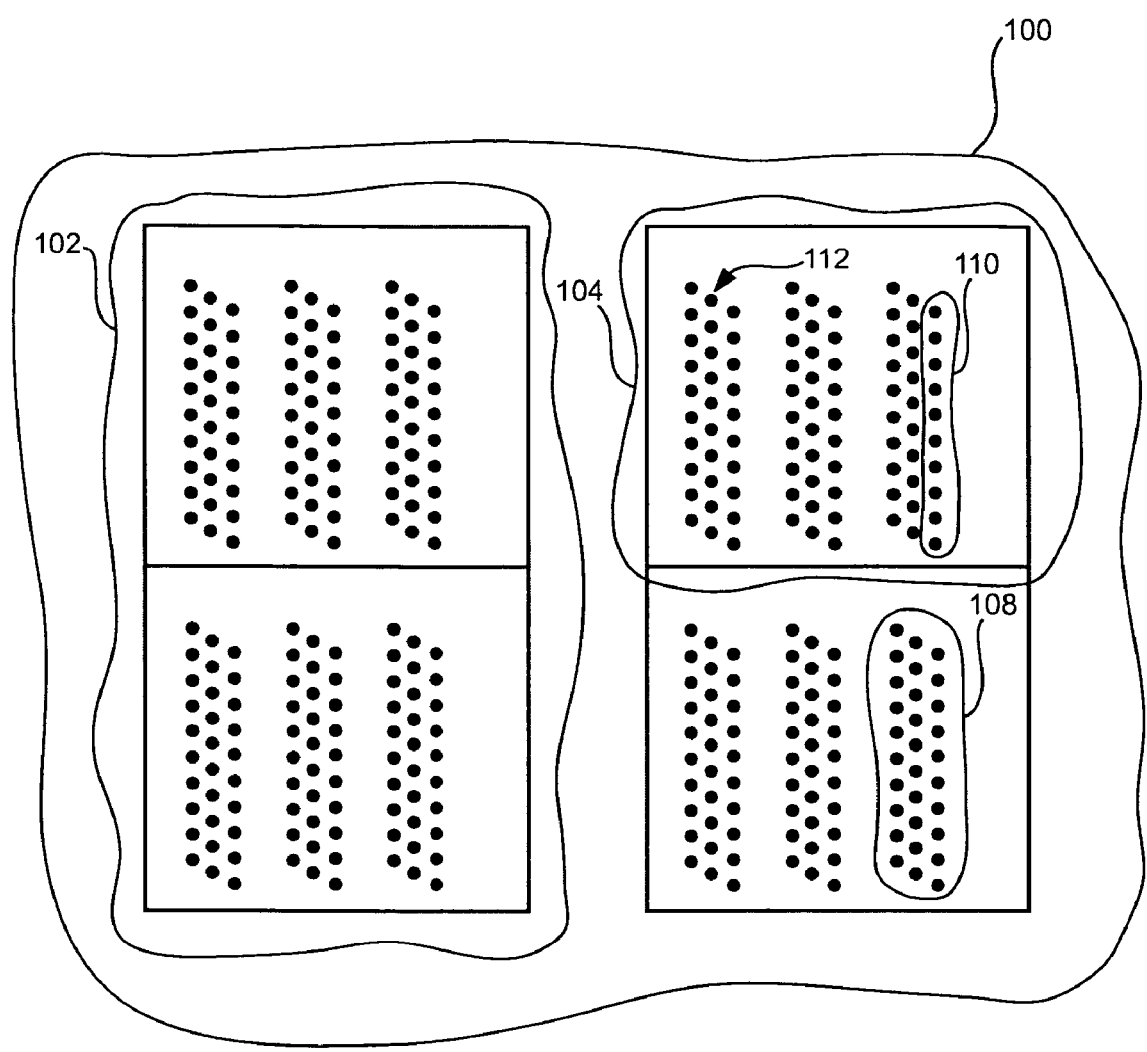
FIG. 3 provides a view of an exemplary printhead assembly.

As to the subject methodology itself, it involves a set of criteria defining an "Aggregation Hierarchy." In the subject model's hierarchy, there exists a "Printhead Assembly" as represented in FIG. 3. The Assembly 100 corresponds to the sum of all printheads on a writer. The Printhead Assembly is made up of one or more "Printhead Groups" 102, each of which can print a complete set of the fluids to be dispensed by the writer. Each Printhead Group is made up of one or more "Printheads" 104, each of which object can be made to fire at a specific point (a "Trigger Point" 106, see FIG. 4) along the travel of the substrate. Each Printhead is made up of one or more "Wells" 108, each of which contains exactly one of the fluids to be printed. Each Well is made up of one or more "Nozzle Regions" 110, which are distinct from each other either by their physical separation along one axis or by the way they are fired. Each Nozzle Region is made up of one or more "Nozzles" 112, which is the smallest addressable unit of the printhead. All of these terms are well understood by those with skill in the art.

Figure 4:
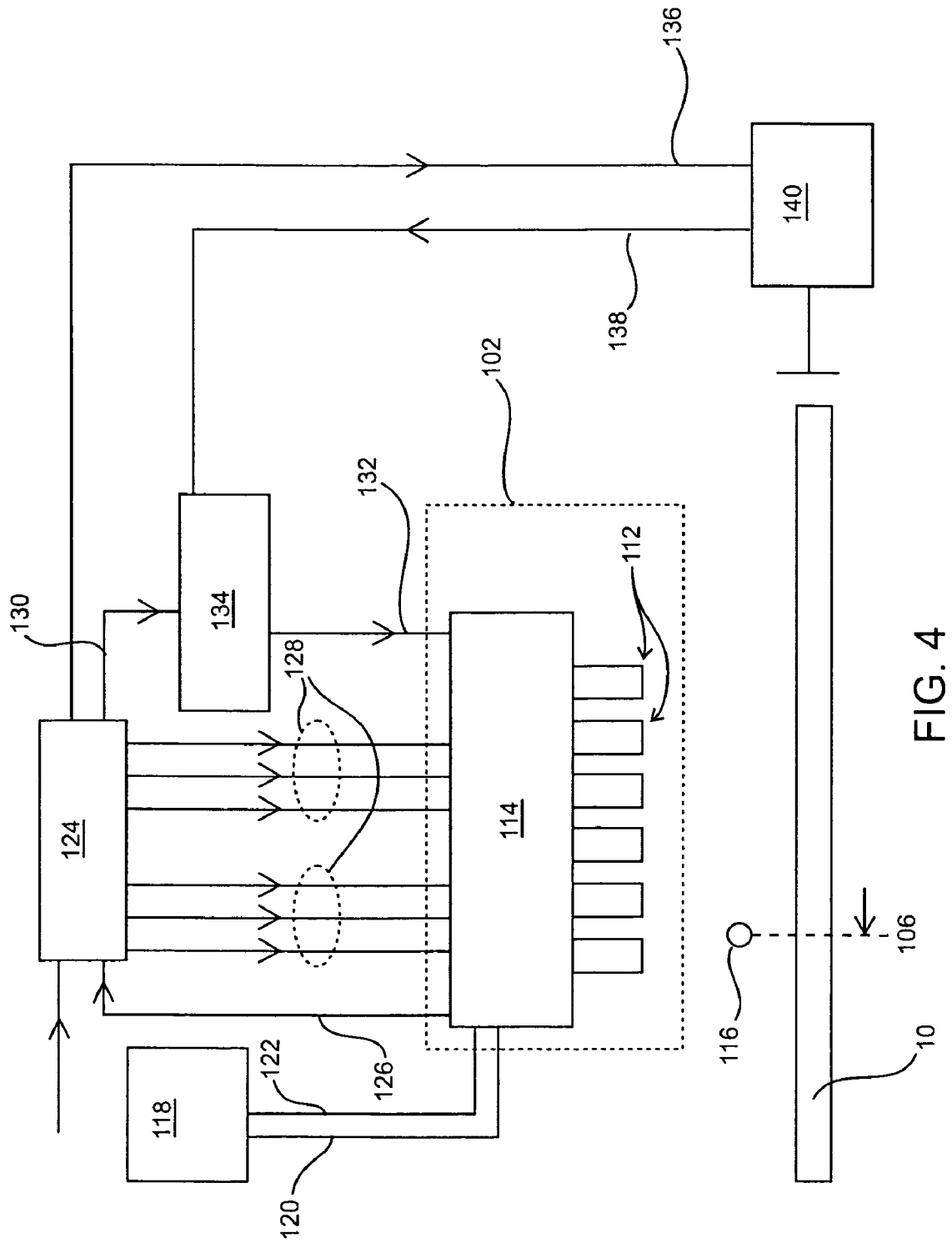
FIG. 4 shows an exemplary printer system.

Additional control components of an exemplary printer system are shown in Fig. 4. Here, each of printhead 102 and nozzles 112 are shown. A piezo element 114 may actuate firing of droplets 116 for contact with the substrate 10 or resistance-based firing is possible.

A remote fluid reservoir 118 may be provided to feed such fluid for the production of chemical, particularly biopolymer, arrays. Information from the printhead (possibly the parameterized information fitting into the subject model) may be provided to a system controller 120 along information line 122. Suitably programmed according to the operation of the present invention, the controller 124 directs both printhead firing and motor 140 control in the example shown. The former situation being effected by a plurality of nozzle control lines 128 to the nozzle region(s) and a firing pulse control lines 130 to a firing pulse amplifier 134. Motor control is achieved by via control signal and position synchronization feedback along control signal line 136 and position synchronization line 138. Each Nozzle may fire one or more drops 116 depending on the nature of the firing signal sent to the printhead based pattern information input to the controller 124. Optionally, separate controllers may be provided for printhead firing and motor control.

At each level of the "Aggregation Hierarchy" (i.e., each subset of elements in the preceding paragraph), each of the respective elements is attributed a Cartesian position and angular orientation relative to the first element. According to the implementation of the present invention, software code is provided that accounts for input parameters at each level within the Aggregation Hierarchy for control code at that level as well as providing context for the elements at the next lower level. Stated otherwise, the general method of accomplishing tasks with the above set of classes is for an application to invoke a method on the Printhead Assembly Objects (e.g., the type of printhead(s), number of such printheads, type of nozzle plate and alignment approach or method employed). The overall inventive, then, invokes a similar procedure on each of the Printhead Group Objects (e.g., the number of wells per printhead, number of orifices per well, number of rows per printhead, spacing between printhead orifices and spacing between nozzle rows), which invoke a similar method on the next level down, and so on, as necessary to complete the task. Depending on the task, there may be some processing done at a certain level before or after the invocation of the next level's method.

In the subject method, the following information is provided by way of catalogued information provided in connection with a selected printhead or directly input by a user or automatically gathered for the at least one selected printhead to be used. The information may be scanned or read in or it may by be provided via access to a menu correlated to printhead model or serial number, via stored data as referred to above, or otherwise. In any case, it is important to note that an operator or end user (as opposed to a programmer) is able to enter the information in some manner (or have it entered in some manner) that is required to reconfigure the print driver software.

As for the Printhead Assemblies, they may vary by at least: the type of printheads (e.g., piezo or thermal based), number of printheads provided, the type of nozzle orifice plate, the nature of the mechanical alignment method to adjust the position of the orifice plate in space. Such information may be expressed in terms of serial (or model) numbers, the X, Y and theta position values for the plate carrying an array to be printed on, the installation date, and any service history affecting the nature of the components.

The printheads themselves may vary by at least: number of wells per printhead, the number of nozzle orifices per well, the number of rows of orifices, the spacing between orifices and the spacing between rows. Such information may be expressed in terms of: printhead type, its serial (or model) number, printhead X, Y and Z position/placement, nozzle pitch (spacing), the printhead nozzle map, chemistry for each nozzle, electrical waveform for firing, printhead temperature and setpoint, and (again) the installation date, and any service history affecting the nature of the components.

When installing a new head in an array printing system, a user will generally read in such configuration information/data as possible. As stated previously, such data may be input directly or be automatically provided in connection with product numbers or the like.

The program application of the invention will then reconfigure the driver software to control writer/printhead function. The fit may be exact, or the programming may derive a "best fit" for the input parameters based on pre-programmed or partially pre-programmed control routines.

Figure 5:
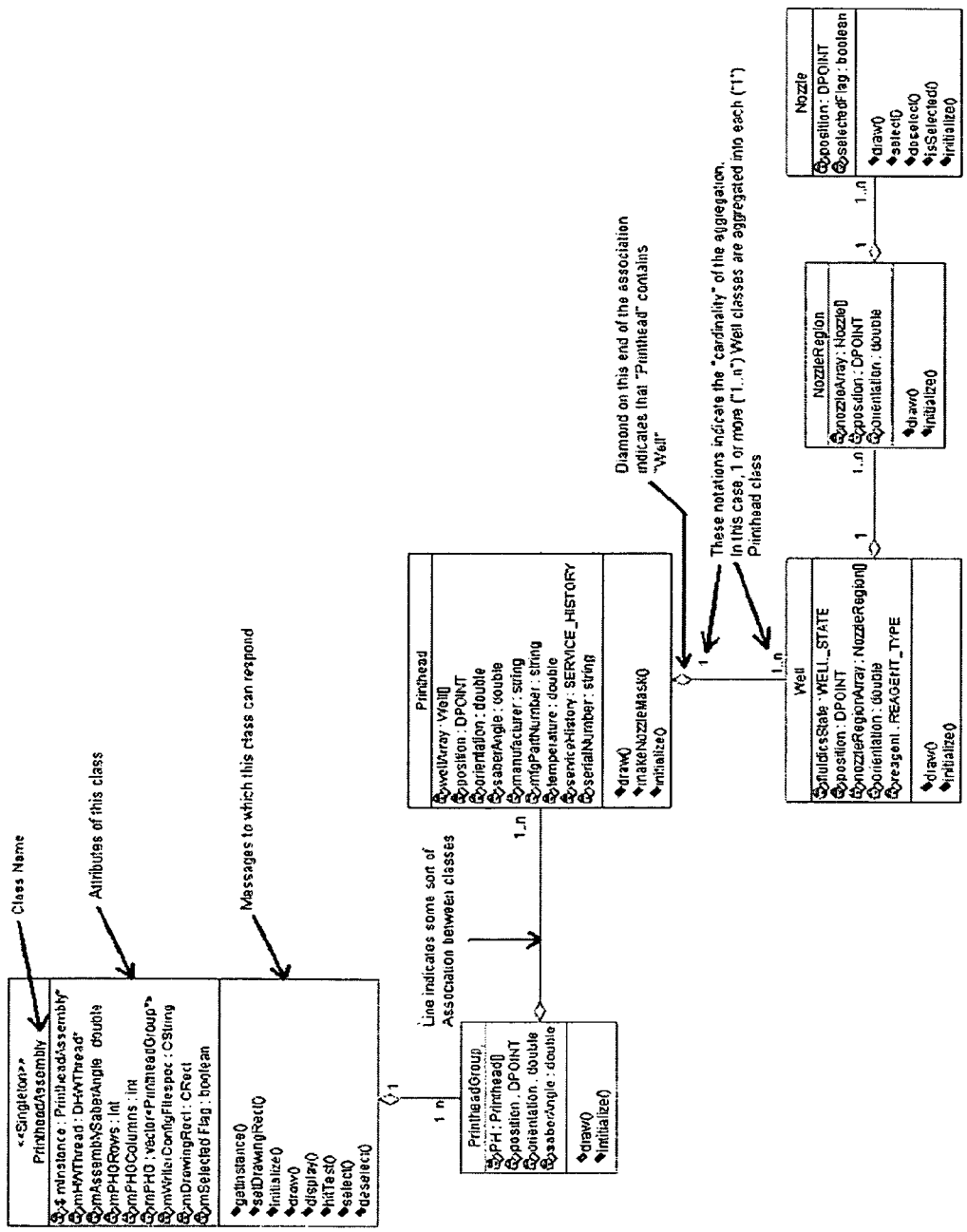
FIG. 5 show an exemplary UML class diagram.

However the system may operate, it will serve to control the function of the printhead assembly for whatever available hardware is chosen as set in a selected configuration. In either case, the system processor preferably operates on information as illustrated in the UML diagram of FIG. 5. The diagram itself is labeled in explanation of the relation between the various classes.

As for further specifics associated with hardware implementation of aspects of the invention, these specifics are discussed below. Particularly, a suitable array fabrication system is described. Next an array product produced according to the teachings of the invention is described.

Array Fabrication Hardware

Now referring to FIG. 1, an exemplary array fabrication system is provided. The apparatus includes a substrate station 20 on which a substrate 10 can be retained. Pins or similar means (not shown) can be provided on substrate station 20 by which to approximately align substrate 10 to a nominal position thereon. Substrate 10 may be retained on substrate station 20 simply by weight. However, more secure retention is provided by substrate station 20 including a vacuum chuck connected to a suitable vacuum source (not shown) to retain a substrate 10 without exerting too much pressure thereon, since substrate 10 is often made of glass or silica.

A movable print head system 210 (optionally, with one or more print or ejection heads 210a, 210b) is retained by a head retainer 208. Head system 210 can be positioned at any position facing a retained substrate 10, by means of a transport system. The transport system includes a carriage 62 connected to a first transporter 60 controlled by processor 140 through line 66, and a second transporter 100 controlled by processor 140 through line 106. Transporter 60 and carriage 62 are used to execute one axis positioning of station 20 (and hence mounted substrate 10) facing the dispensing head system 210, by moving it in the direction of nominal axis 63, while transporter 100 is used to provide adjustment of the position of head retainer 208 in a direction of nominal axis 204. In this manner, head system 210 can be scanned line by line, by scanning along a line over substrate 10 in the direction of axis 204 using transporter 100 while substrate 10 is stationary, while line by line movement of substrate 10 in a direction of axis 63 is provided by transporter 60 while head system 210 is stationary. Head system 210 may also optionally be moved in a vertical direction 202, by another suitable transporter (not shown). However, it will be appreciated that other scanning configurations could be used. Also, it will be appreciated that both transporters 60 and 100, or either one of them, with suitable construction, could be used to perform the foregoing scanning of head system 210 with respect to substrate 10. Thus, in reference to "positioning", "moving", or "displacing" or the like, one element (such as head system 210) in relation to another element (such as one of the stations 20 or substrate 10), it is to be understood that any required moving can be accomplished by moving either element or a combination of both of them.

An encoder 30 communicates with processor 140 to provide data on the exact location of substrate station 20 (and hence substrate 10 if positioned correctly on substrate station 20), while encoder 34 provides data on the exact location of holder 208 (and hence head system 210 if positioned correctly on holder 208). Any suitable encoder, such as an optical encoder, may be used which provides data on linear position. Angular positioning of substrate station 20 is provided by a transporter 120, which can rotate substrate station 20 about axis 202 under control of processor 140. Typically, substrate station 20 (and hence a mounted substrate) is rotated by transporter 120 under control of processor 140 in response to an observed angular position of substrate 10 as determined by processor 140 through viewing one or more fiducial marks on a retained substrate 10 (particularly fiducial marks 18) with a camera (such as camera 304). This rotation will continue until substrate 10 has reached a predetermined angular relationship with respect to dispensing head system 210. In the case of a square or rectangular substrate, the mounted substrate 10 will typically be rotated to align one edge (length or width) with the scan direction of head system 210 along axis 204.

Head system 210 may contain one or more (e.g., two or three) heads mounted on the same head retainer 208. Each such head may be the same in construction as a head type commonly used in an ink jet type printer or types used in industrial printing. Indeed, by way of the use of the present invention, the printhead may be selected from any of a variety of commercially available or custom printhead configurations.

In any case, each printhead ejector may be in the form of a piezoelectric crystal operating under control of processor 140 (although resistors for thermally activated ejectors could be used instead). The operative principles of the invention remains essentially the same in either case, thought the specifics of the control voltage responsible for nozzle firing may differ in such case. Exemplary pulse jet printheads are presented in the references noted above, which—as stated previously—are incorporated by reference herein in their entirety.

As is well known in the pulse jet print art, the amount of fluid that is expelled in a single activation event of a pulse jet is dependent on any of a number of parameters, including: the orifice diameter, the orifice length (thickness of the orifice member at the orifice), the size of the deposition chamber, and the size of the piezoelectric or heating element, among others. The amount of fluid that the control program is set to expel during a single activation event is generally in the range about 0.1 to 1000 pL, usually about 0.5 to 500 pL and more usually about 1.0 to 250 pL. A typical velocity at which the fluid is expelled from the chamber is more than about 1 m/s, or may be more than about 10 m/s, and may be as great as about 20 m/s or greater.

The apparatus may include a sensor in the form of a camera 304, to monitor dispensers for errors (such as failure to dispense droplets) by monitoring for drops dispensed onto substrate 10 when required of a dispenser. Camera 304 can also image the structures on surface 11a. Camera 304 communicates with processor 140, and should have a resolution that provides a pixel size of about 1 to 100 micrometers and more typically about 4 to 20 micrometers or even 1 to 5 micrometers. Any suitable analog or digital image capture device (including a line by line scanner) can be used for such camera, although if an analog camera is used processor 140 should include a suitable analog/digital converter. A detailed arrangement and use of such a camera to monitor for dispenser errors, is described in U.S. Pat. No. 6,232,072, the disclosure of which is incorporated herein by reference. Particular observations techniques are described, for example, in co-pending U.S. patent application Ser. No. 09/302,898 filed Apr. 30, 1999 by Caren et al., assigned to the same assignee as the present application, the disclosure of which is incorporated herein by reference. Monitoring by such means can occur during formation of an array and the information used during fabrication of the remainder of that array or another array, or test-print patterns can be run before array fabrication.

Alternatively, or additionally, means for electronically monitoring pulse jet activity may be provided by electronic monitoring means. Such an approach is disclosed in U.S. patent application Ser. No. 10/452,800, published as US 2004-0241667, entitled "Pulse Jet ejection head Diagnostic System", filed May 30, 2003. Yet, neither such provisions for monitoring need be providing in a system programmed to operate according to the present invention. On one hand, they may provide certain desirable redundancy of offer supplemental features. Still, their omission may be desired from a basic cost-savings perspective.

Regardless, in the system shown in FIG. 1 a display 310, speaker 314, and a operator input device 312, may also provided. Operator input device 312 may, for example, be a keyboard, mouse, or the like. Processor 140 has access to a memory 141, and controls print head system 210 (specifically, the activation of the ejectors therein), operation of the transport system, operation of each jet in print head system 210, capture and evaluation of images from the camera 304, and operation display 310 and speaker 314. In this regard, the processor may be used to offer a user interface screen for user entry of printhead related data. The user selected and/or entered data may be selected from one or more of: the type of said printhead, number of such printheads, type of nozzle plate, nozzle plate alignment method, number of wells per printhead, number of orifices per well, number of rows per printhead, spacing between printhead orifices, and spacing between nozzle rows, etc. In certain instances the user interface provided in connection with display 310 will prompt user entry of at least one of said criteria, for example, with input device3 312.

Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the functions required of it as described herein. It will be appreciated though, that when a "processor" such as processor 140 is referenced throughout this application, that such includes any hardware and/or software combination that will perform the required functions. Suitable programming can be provided remotely to processor 140, or previously saved in a computer program product such as memory 141 or some other portable or fixed computer readable storage medium using any of those devices mentioned below in connection with memory 141. For example, a magnetic or optical disk 324 may carry the programming, and can be read by disk reader 326.

As for the basic operation of the system in FIG. 1, first, it will be assumed that memory 141 holds a target drive pattern as derived (at least in part) according to the teachings of the subject methodology/generalize printhead model. The target drive pattern provides the instructions for driving the apparatus components as required to form the target array (which includes target locations and dimension for each spot to form an array pattern) on substrate 10 and includes, for example, movement commands to transporters 60 and 100 as well as firing commands for each of the pulse jets in head system 210 coordinated with the movement of head system 210 and substrate 10, as well as instructions as to which polynucleotide precursor solution or activator solution is loaded in each pulse jet (i.e., that is, the "loading pattern").

Such solutions may be provided to the different pulse jets through appropriate respective conduits (not shown) communicating between the head system 210 and respective reservoirs (not shown). An appropriate arrangement of the foregoing is disclosed, for example, in U.S. Pat. No. 6,372,483. The target drive pattern is based upon the target array pattern and can have either been input from an appropriate source (such as input device 312, a portable magnetic or optical medium, or from a remote server, any of which communicate with processor 140), or may have been determined by processor 140 based upon an input target array pattern (using any of the appropriate sources previously mentioned) and the previously known nominal operating parameters of the apparatus. Further, it will be assumed that drops of different biomonomer or biopolymer containing fluids (or other fluids) have been placed at respective regions of a loading station (not shown).

In instances where piezo-based printheads are used, note that in the target drive pattern the waveform supplied to each piezoelectric crystal in head system 210 determines the deformation of the crystal, which in turn determines the pressure pulse imparted on the fluid in the pulse jet. The velocity of the exiting drops can be adjusted by adjusting the amplitude of each pulse in the waveform. Adjustment of waveform to obtain velocity control is generally described in U.S. Pat. No. 6,402,282, European Patent Publication EP0721840A2, and U.S. patent application Ser. No. 10/206,446, the disclosures of which are incorporated herein by reference.

Substrate 10 is loaded onto substrate station 20, if not previously loaded, either manually by an operator, or optionally by a suitable automated driver (not shown) controlled, for example, by processor 140. The deposition sequence is then initiated to deposit the desired sequence of drops of nucleotide monomers (particular phosphoramidite monomers) or activator solution, onto the substrate according to the drive pattern. As already mentioned, in this sequence processor 140 will operate the apparatus according to the drive pattern, by causing the transport system to position head system 210 facing substrate station 20, and particularly the retained substrate 10, and with head system 210 at an appropriate distance from substrate 10. Processor 140 then causes the transport system to scan head system 210 across substrate 10 line by line (or in some other desired pattern), while co-coordinating activation of the ejectors in head system 210 so as to dispense droplets as described above. This may include the droplet deposition over multiple cycles as required by the in situ synthesis process. For the in situ process the substrate may be moved between cycles to a flood station for exposure of its entire surface to an oxidizing agent and deprotecting agent, in a known manner.

At this point the droplet dispensing sequence is typically complete and the arrays have been fabricated on surface. A final deprotection step may be required as is known.

Utility

The computer program and methodology potentially finds use in producing a variety of printed product. Yet, it is most especially applicable in producing biopolymer arrays. Arrays produce with the noted teaches also fall within the scope of the present invention.

In this regard, the subject biopolymer arrays produced according to aspects of the present invention find use in a variety applications, where such applications are generally analyte detection applications in which the presence of a particular analyte in a given sample is detected at least qualitatively, if not quantitatively. Protocols for carrying out array assays are well known to those of skill in the art and need not be described in great detail here. Generally, the sample suspected of comprising the analyte of interest is contacted with an array under conditions sufficient for the analyte to bind to its respective binding pair member that is present on the array. Thus, if the analyte of interest is present in the sample, it binds to the array at the site of its complementary binding member and a complex is formed on the array surface. The presence of this binding complex on the array surface is then detected, e.g., through use of a signal production system such as an isotropic or radioactive or fluorescent label present on the analyte, etc. The presence of the analyte in the sample is then deduced from the detection of binding complexes on the substrate surface.

Specific analyte detection applications of interest include hybridization assays in which the nucleic acid arrays of the subject invention are employed. In these assays, a sample of target nucleic acids is first prepared, where preparation may include labeling of the target nucleic acids with a label, e.g., a member of signal producing system. Following sample preparation, the sample is contacted with the array under hybridization conditions, whereby complexes are formed between target nucleic acids (or other molecules) that are complementary to probe sequences attached to the array surface. The presence of hybridized complexes is then detected. Specific hybridization assays of interest which may be practiced using the subject arrays include: gene discovery assays, differential gene expression analysis assays; nucleic acid sequencing assays, and the like. References describing methods of using arrays in various applications include U.S. Pat. Nos. 5,143,854; 5,288,644; 5,324,633; 5,432,049; 5,470,710; 5,492,806; 5,503,980; 5,510,270; 5,525,464; 5,547,839; 5,580,732; 5,661,028; 5,800,992—the disclosures of which are herein incorporated by reference.

Where the arrays are arrays of polypeptide binding agents, e.g., protein arrays, specific applications of interest include analyte detection/proteomics applications, including those described in U.S. Pat. Nos. 4,591,570; 5,171,695; 5,436,170; 5,486,452; 5,532,128 and 6,197,599 as well as published PCT application Nos. WO 99/39210; WO 00/04832; WO 00/04389; WO 00/04390; WO 00/54046; WO 00/63701; WO 01/14425 and WO 01/40803—the disclosures of which are herein incorporated by reference.

Figure 2:
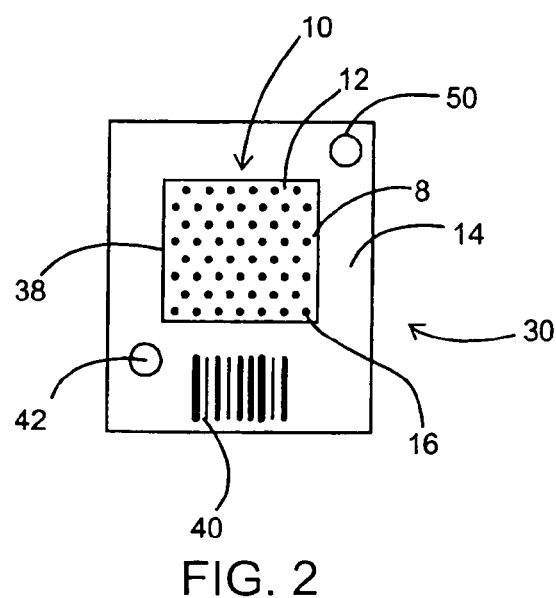
FIG. 2 is a top view of a packaged array that may be produced according to and used in connection with the present invention.

An exemplary array is presented in FIG. 2. Array 10 carries multiple probe features 16 disposed across a surface of the substrate 12. The substrate is preferably in the form of a contiguous, substantially planar substrate made of transparent material to facilitate data acquisition scanning there through. Alternatively, the substrate could be scanned from the side which carries features 16. Features 16 (not to scale) are shown disposed in a pattern which defines the array. The extent of the pattern defines a scan region 8.

Array 10 may be set within a housing 14 to provide an array package 30. In which case, substrate 10 is sealed (such as by the use of a suitable adhesive) to housing 14 around a margin 38. Housing 14 is configured such that it and substrate 12, define a chamber into which features 16 of the array face. This chamber is accessible through resilient septa 42, 50 which define normally closed ports of the chamber. An identifier 40, possibly in the form of a bar code, may be affixed to housing 14. The composition of the probe features and material(s) used to produce elements of the array package may vary, but may be as typical in the art.

In use, the array will typically be exposed to a sample (such as a fluorescently labeled analyte, e.g., protein containing sample) and the array will then be read. Reading of the array may be accomplished by illuminating the array and reading the location and intensity of resulting fluorescence at each feature of the array to detect any binding complexes on the surface of the array.

A scanner that may be used for this purpose is the AGILENT MICROARRAY SCANNER manufactured by Agilent Technologies, Palo Alto, Calif. Other suitable apparatus and methods are described in U.S. Pat. Nos. 5,585,639; 5,760,951; 5,763,870; 6,084,991; 6,222,664; 6,284,465; 6,329,196; 6,371,370 and 6,406,849—the disclosures of which are herein incorporated by reference. Other suitable scanning devices are commercially available from Axon Instruments in Union City, Calif. and Perkin Elmer of Wellesly, Mass. Analysis of the data, (i.e., collection, reconstruction of image, comparison and interpretation of data) may be employed with associated computer systems and commercially available software, such as GenePix by Axon Instruments, QuantArray by Perkin Elmer or Feature Extraction by Agilent of Palo Alto, Calif.

Yet, the arrays may be read by any method or apparatus other than the foregoing. Other possible reading methods include other optical techniques (for example, detecting chemiluminescent or electroluminescent labels) and electrical techniques (where each feature is provided with an electrode to detect hybridization at that feature in a manner disclosed in U.S. Pat. Nos. 6,251,685 and 6,221,583—the disclosures of which are herein incorporated by reference).

In any case, results from reading an array may be raw results (such as fluorescence intensity readings for each feature in one or more color channels) or may be processed results such as obtained by applying saturation factors to the readings, rejecting a reading for a feature which is above or below a predetermined threshold and/or forming conclusions based on the pattern read from the array (such as whether or not a particular target sequence may have been present in the sample).

The results of the reading (processed or not) may be forwarded (such as by communication) to a remote location if desired, and received there for further use (such as further processing). Stated otherwise, in certain variations, the subject methods may include a step of transmitting data from at least one of the detecting and deriving steps, to a remote location. The data may be transmitted to the remote location for further evaluation and/or use. The same such treatment may be afforded quality control data generated and saved in connection with the diagnostic methodology noted above. In many instances, it may be preferred to pair reading results with quality control information. Any convenient telecommunications means may be employed for transmitting the data, e.g., facsimile, modem, Internet, etc.

Alternatively, or additionally, the data representing array results may be stored on a computer-readable medium of any variety such as noted above or otherwise. Retaining such information may be useful for any of a variety of reasons as will be appreciated by those with skill in the art. The same holds for quality control data (whether it be raw or processed data) produced as described above or otherwise.

Kits

Kits for use in connection with the subject invention may also be provided. Such kits typically include at least a computer readable medium including instructions and programming embodying or adapted to direct the functionality as discussed above. The instructions may include software installation or setup directions. The instructions may include directions for directing the scanner to perform as desired. Typically, the instructions include both types of information.

Providing the software and instructions as a kit may serve a number of purposes. As shown in FIG. 1, the combination may be packaged in a wrapper 80 and purchased as a means of upgrading an existing scanner. The full program or some portion of it (typically at least such code as defining the subject methodology—alone or in combination with the code already available) may be provided as an upgrade patch. Alternately, the combination may be provided in connection with a new scanner in which the software is preloaded on the same. In which case, the instructions may serve as a reference manual (or a part thereof) and the computer readable medium as a backup copy to the preloaded utility.

In other instances, kits in accordance with the invention will include at least one of the arrays 30 as described above in a wrapper 80. Especially in the kits including one or more arrays, it may be desired to further include one or more additional components necessary for carrying out an analyte detection assay, such as one or more sample preparation reagents, buffers and the like. As such, the kits may include one or more containers 84 such as vials or bottles, with each container containing a separate component for the assay, and reagents for carrying out an array assay such as a nucleic acid hybridization assay or the like. The kits may also include buffers (such as hybridization buffers), wash mediums, enzyme substrates, reagents for generating a labeled target sample such as a labeled target nucleic acid sample, negative and positive controls. As above, written instructions—but this time for using the array assay devices for carrying out an array based assay—may be provided in the kit.

Any instructions are generally recorded on a suitable recording medium. For example, the instructions may be printed on a substrate, such as paper or plastic, etc. As such, the instructions may be present in the kits as a package insert 82, in the labeling of the container of the kit or components thereof (i.e., associated with the packaging or subpackaging), etc. In other embodiments, the instructions are present as an electronic storage data file present on a suitable computer readable storage medium 84, e.g., CD-ROM, diskette, etc., including the same medium on which the program is presented.

In yet other embodiments, the instructions are not themselves present in the kit, but means for obtaining the instructions from a remote source, e.g. via the Internet, are provided. An example of this embodiment is a kit that includes a web address where the instructions can be viewed and/or from which the instructions can be downloaded. Conversely, means may be provided for obtaining the subject programming from a remote source, such as by providing a web address. Still further, the kit may be one in which both the instructions and software are obtained or downloaded from a remote source, as in the Internet or world wide web. Of course, some form of access security or identification protocol may be used to limit access to those entitled to use the subject invention. As with the instructions, the means for obtaining the instructions and/or programming is generally recorded on a suitable recording medium.

It is evident from the above discussion that the above described invention provides an effective and readily applicable way to offer flexibility in the control and selection of various printheads. As such, the subject invention represents a significant contribution to the art of both production equipment design and in software control of the same.

All publications and patents cited in this specification are herein incorporated by reference as if each individual publication or patent were specifically and individually indicated to be incorporated by reference (except insofar as any may conflict with the present application—in which case the present application prevails). The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, operation, to the objective, spirit and scope of the present invention. Indeed, the techniques described herein can be applied to any application where discrete spots on a substrate need to be deposited. This subject applies even to flat panel displays and the like. All such modifications are intended to be within the scope of the invention, of which aspects are expressed in the following claims.

What is claimed is:

1. A method for preparing a biopolymer array production system for operation, the method comprising:

providing a biopolymer array production system comprising:

a substrate station configured to retain a biopolymer array substrate;

a movable printhead system comprising a first printhead assembly; and a computer processor configured to control said movable printhead system to form a biopolymer array on a substrate retained in said substrate station;

replacing said first printhead assembly with a second printhead assembly, wherein said first and second printhead assemblies are different and wherein said second printhead assembly comprises multiple printheads, wherein each of said printheads comprises a nozzle plate, one or more wells, wherein each of said one or more wells comprises one or more nozzle regions, wherein each of said one or more nozzle regions comprises one or more nozzle rows and wherein each of said one or more nozzle rows comprises multiple nozzle orifices;

entering, by an operator using an operator input device or electronically reading from electronic media, printhead-related data into said computer processor, wherein printhead-related data includes one or more of: the type of each of said printheads, number of said printheads of said printhead assembly, type of nozzle plate on each of said printheads, alignment method of said nozzle plate, number of wells per each of said printheads, number of nozzle orifices per well, number of nozzle rows per each of said printheads, spacing between said nozzle orifices, and spacing between said nozzle rows, wherein said type of each of said printheads is selected from a piezo-based printhead, a thermal-based printhead or a resistance-based printhead; and configuring, with said computer processor, a printhead control routine based on said entered data, in order to control printhead function.

2. The method of claim 1, wherein a user interface prompts user entry of at least one of said criteria.

3. The method of claim 2, wherein a user enters at least one of said criteria.

4. The method of claim 1 wherein said type of printheads, number of said printheads, type of nozzle plate and alignment method are Printhead Assembly Objects, and said number of wells per each of said printheads, number of nozzle orifices per each of said wells, number of nozzle rows per each of said printheads, spacing between nozzle orifices and spacing between nozzle rows are Printhead Group Objects, as treated by said processor.

5. The method of claim 4, wherein, when one or more data selected from Printhead Assembly Objects is entered and one or more data selected from Printhead Group Objects is entered, said processor first configures a portion of said control routine based on said entered data from Printhead Assembly Objects, then configures another portion of said control routine based on said entered data from Printhead Group Objects in relation to said entered data from Printhead Assembly Objects.

6. A method for preparing a biopolymer array production system for operation, the method comprising:

providing a biopolymer array production system comprising:

a substrate station configured to retain a biopolymer array substrate;

a movable printhead system comprising a first printhead assembly; and a computer processor configured to control said movable printhead system to form a biopolymer array on a substrate retained in said substrate station;

replacing said first printhead assembly with a second printhead assembly, wherein said first and second printhead assemblies are different and wherein said second printhead assembly comprises multiple printheads, wherein each of said printheads comprises a nozzle plate, one or more wells, wherein each of said one or more wells comprises one or more nozzle regions, wherein each of said one or more nozzle regions comprises one or more nozzle rows and wherein each of said one or more nozzle rows comprises multiple nozzle orifices;

providing printhead-related data into said computer processor, wherein said printhead-related data includes Printhead Assembly Object criteria and Printhead Group Object criteria, said Printhead Assembly Object criteria selected from the type of each of said printheads, number of said printheads of said printhead assembly, type of nozzle plate on each of said printheads and alignment method of said nozzle plate, said Printhead Group Object criteria selected from a number of wells per each of said printheads, number of nozzle orifices per well, number of nozzle rows per each of said printheads, spacing between said nozzle orifices and spacing between said nozzle rows, wherein said type of each of said printheads is selected from a piezo-based printhead, a thermal-based printhead or a resistance-based printhead; and configuring, with said computer processor, a printhead control routine based on said data by first producing a portion of said control routine based on said Printhead Assembly Objects, then producing another portion of said routine based on said Printhead Group Objects in relation to said Printhead Assembly Objects.

7. The method of claim 6, wherein an operator enters information corresponding to at least a portion of said printhead-related data.

8. The method of claim 6, wherein said printhead-related data is provided from electronic media associated with said second printhead assembly.

9. A method of producing a biopolymer array, the method comprising:

providing a production system prepared according to the method of any of claims 1 through 7, and controlling said system by said control routine to print a biopolymer array by ejecting reagent drops from any of said printheads spaced from a substrate surface during movement of said printheads and said surface relative to each other, wherein said reagent drops are ejected according to a predetermined pattern onto said surface to produce said array.

10. The method of claim 9, wherein said biopolymers are polyncucleotides or polypeptides.

11. A method of detecting the presence of an analyte in a sample, said method comprising:

producing a biopolymer array according to the method of claim 9;

contacting a sample suspected of comprising said analyte with said biopolymer array; and detecting any binding complexes on the surface of said biopolymer array to obtain binding complex data.

12. The method of claim 11, wherein said analyte is a nucleic acid.

13. A method comprising transmitting data resulting from a detecting according to claim 11, from a first location to a remote location.

14. A method comprising receiving data representing a result of a reading obtained by the method of claim 11.

15. A method comprising forwarding data representing a result of a reading an array fabricated by the method of claim 11.

16. A computer-readable medium comprising a program as configured by the method of claim 1 to direct an array fabrication apparatus.

17. A kit comprising the computer readable medium of claim 16, in packaged combination with instructions for use with an array fabrication apparatus.

18. The method of claim 1, wherein said printhead assemblies comprise multiple printhead groups comprising one or more printheads, each of said printhead groups capable of printing a complete set of fluids to be dispensed by said printhead assembly.

19. The method of claim 1, wherein said entering step comprises entering printhead-related data including criteria for both the type of each of said printheads and alignment method of said nozzle plate.

20. The method of claim 1, wherein said entering step comprises entering printhead-related data including criteria for both the number of said printheads of said second printhead assembly and alignment method of said nozzle plate.

21. The method of claim 1, wherein said entering step comprises entering printhead-related data including criteria for both the number of nozzle rows per each of said printheads and the spacing between said nozzle rows.

22. The method of claim 1, wherein said entering step comprises entering printhead-related data comprising all of said criteria.

* * * * *

UNITED STATES PATENT AND TRADEMARK OFFICE
CERTIFICATE OF CORRECTION

| | |
|---|---|
| PATENT NO. | : 7,875,463 B2 |
| APPLICATION NO. | : 10/809981 |
| DATED | : January 25, 2011 |
| INVENTOR(S) | : David R. Adaskin et al. |

It is certified that error appears in the above-identified patent and that said Letters Patent is hereby corrected as shown below:

In column 20, line 32, in Claim 10, delete "polyncucleotides" and insert -- polynucleotides --, therefor.

Signed and Sealed this
Twenty-first Day of June, 2011

David J. Kappos
*Director of the United States Patent and Trademark Office*